United States Patent [19]

Baris et al.

[11] Patent Number: 5,759,685
[45] Date of Patent: Jun. 2, 1998

[54] SOIL-REPELLENT AND ABRASION-RESISTANT MONOFILAMENTS AND METHODS OF MAKING AND USING SAME

[75] Inventors: Halim Baris, Lucerne, Switzerland; Etienne Fleury, Irigny, France

[73] Assignee: Rhone-Poulenc Viscosuisse S.A., Emmenbruecke, Switzerland

[21] Appl. No.: 392,926

[22] PCT Filed: Jun. 28, 1994

[86] PCT No.: PCT/IB94/00183

§ 371 Date: Feb. 27, 1995

§ 102(e) Date: Feb. 27, 1995

[87] PCT Pub. No.: WO95/01471

PCT Pub. Date: Jan. 12, 1995

[30] Foreign Application Priority Data

Jul. 2, 1993 [CH] Switzerland ............ 1990/93

[51] Int. Cl.⁶ ............................................. D02G 3/00
[52] U.S. Cl. ............... 428/364; 428/394; 428/395; 264/210.1; 264/211.1; 264/211.13; 264/211.14; 525/446; 528/26
[58] Field of Search ................ 528/26; 525/446; 428/394, 395, 364; 264/210.1, 211.11

[56] References Cited

U.S. PATENT DOCUMENTS

| | | | |
|---|---|---|---|
| 3,701,815 | 10/1972 | Matzner et al. | 525/446 |
| 4,164,674 | 8/1979 | Salmon et al. | 428/395 |
| 4,833,032 | 5/1989 | Reese | 428/364 |
| 4,894,427 | 1/1990 | Yamamoto et al. | 528/26 |
| 4,950,539 | 8/1990 | Specker et al. | 428/364 |
| 5,084,527 | 1/1992 | Yamamoto et al. | 525/446 |
| 5,132,392 | 7/1992 | DeYoung et al. | 520/272 |
| 5,191,036 | 3/1993 | Yamamoto et al. | 525/446 |
| 5,350,632 | 9/1994 | Lang | 428/392 |
| 5,366,797 | 11/1994 | Rötgers et al. | 428/374 |
| 5,431,999 | 7/1995 | Fischer et al. | 428/364 |
| 5,472,780 | 12/1995 | Baris et al. | 428/364 |

FOREIGN PATENT DOCUMENTS 269023  6/1988  European Pat. Off.

*Primary Examiner*—Patrick Ryan
*Assistant Examiner*—J. M. Gray
*Attorney, Agent, or Firm*—Michael J. Striker

[57] ABSTRACT

The process of making the soil-repellent and abrasion-resistant monofilament includes transesterifying dimethyl-terephthalate with ethylene glycol; adding to the resulting reaction mixture from 0.15 to 5 percent by weight of a polydialkylsiloxane of formula I:

$$-CO-R_1-[Si(R_2)_2-O]_n-Si(R_2)_2-R_1-CO- \qquad (I),$$

wherein n is the number of repeated $-Si(R_2)_2-O-$ groups and $R_1$ or $R_2$ represent the same or different radicals with 2 to 20 carbon atoms; then polycondensing to form a linear silicone-modified polyethylene terephthalate in which the polydialkyl siloxane of formula I is inserted into a polyethylene terephthalate polymer chain thereof; and extruding the linear silicone-modified polyethylene terephthalate to form a monofilament consisting of the silicone-modified polyethylene terephthalate having a silicon content of 0.05 to 2.0% by weight. The monofilament product has a cross-section with a diameter of from 0.1 to 1.0 mm, a homogeneous composition over the entire cross-section, a tenacity of at least 36 cN/tex, an elongation of less than 44% based on an unstretched portion and a soiling index of less than 10 after five soiling cycles.

10 Claims, 3 Drawing Sheets

SOIL-REPELLENT AND ABRASION-RESISTANT MONOFILAMENTS AND METHODS OF MAKING AND USING SAME

BACKGROUND OF THE INVENTION

The invention relates to a process for producing soil-repellent and abrasion-resistant monofilaments of a diameter of between 0.1 to 1.0 mm from linear polyethylene terephthalate/polydialkyl siloxane for producing screen fabrics, as to the monofilaments produced by the process and to methods of using the monofilaments.

"Soil-repellent" properties for screens of paper-making machines are generally understood to mean wet soiling properties, which also presupposes hydrolysis resistance. The soil repellence is intended to be used for extending the cleaning cycles of a screen, wherein cleaning is performed under a high-pressure water stream and, if required, by rubbing with a brush. Soil-repellent monofilaments are worked into industrial fabrics which are employed in the wet portion, in the pressing as well as the drying portion of a paper-making machine. Such screens are subjected to moisture and temperatures far above 100° C., as well as increased mechanical stress during cleaning. Pure polyester monofilaments have disadvantages based on their tendency to soil, their susceptibility to hydrolysis and their relative brittleness. An improvement in their hydrolysis resistance was achieved by adding additives in the form of stabilizers. An increase in soil repellency was attempted, besides the addition of additives, also by suitable finishing treatments of the filament and aftertreatment of the fabric.

"Abrasion-resistant" monofilaments are understood to be those monofilaments with which no actual weight loss could be noted during fibrillation testing as well as only little or no fibrillations.

It was found that co-polyesters modified with siloxanes were excellently suited for the above-mentioned field of use, in spite of their low hydrolysis resistance, because their surface properties are easily modified to provide improved sliding properties and smaller coefficients of friction, by which the brittleness is clearly reduced and soil repellency considerably improved. The formed surfaces can be easily treated again to improve their chemical properties, such as hydrolysis resistance.

Polyester/polydimethyl siloxanes, which are available either in granulate form or are modified by additives directly prior to extrusion, have proven to be especially suitable. Polyoxysilanes of the type which constitute modified polyesters and are provided for use in accordance with the invention are known from U.S. Pat. No. 5,123,392. The known chemically modified polymers are used for producing hydrophilic staple fibers, but are also said to be usable for fabrics made of filament yarns. The hydrophilic properties make possible the rapid absorption of moisture and are therefore mainly used in a mixture with cotton or wool. In their present form yarns having the hydrophilic properties mentioned, however, are unsuited for paper-making machines or fishing lines.

Silicone-modified polyesters which are suitable for producing fibers are also known from EP-A-0 269 023. In the course of producing the polymer, the silicon units are formed in a polyester matrix. During extrusion in air and drawing, these silicon units migrate into the outer envelope of the filament. The surface obtained acts like a hydrophobic film. The chemical composition is not homogeneous in cross section.

SUMMARY OF THE INVENTION

It is the object of the invention to make available a monofilament which is simultaneously soil-repellent and abrasion-resistant and homogeneous in cross section, meets the great demands made on an industrial fabric in respect to its chemical, soil-repelling, mechanical and abrasion-resistant properties and finds its use in the paper industry in particular.

The object of the invention is attained by means of the invention in that 0.15 to 5.0 weight-% of polydialkyl siloxane are inserted into the chain of the polymer by co-condensation, i.e. in the course of the poly-condensation.

The tenacity of the monofilaments is greater than 36 cN/tex with an elongation of <44% referred to the unstretched filament, wherein a particularly good soil repellency and little fibrillation occur as essential characteristic in a surprising manner. The soil repellency has been determined to be a soiling index of <10 following five soiling/cleansing cycles, compared with >14 for a polyester filament without polydimethyl siloxane.

It is practical to use a polyester consisting of at least 85 weight-% of polyethylene terephthalate and a polydialkyl siloxane, wherein the polyethylene terephthalate/polydialkyl siloxane in the finished monofilament contains 0.05 to 2 weight-%, preferably 0.1 to 1.0 weight-% of silicon referred to the polymer, and the homogeneous mixture is extruded into a monofilament. It should be stressed as a particular advantage that the produced monofilament has a homogeneous composition over the entire cross section.

A polyethylene terephthalate to be considered is one which has an intrinsic viscosity of >0.60 dl/g.

Difunctional polydiorgano siloxanes of the general formula:

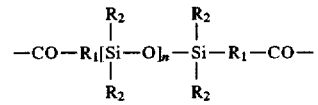

are preferably considered as copolymers, wherein n is the number of repeated —Si(R$_2$)$_2$—O— groups and R1, R2 represent equal or different radicals with 2 to 20 carbon atoms. Polydialkylsiloxanes especially polydimethyl siloxanes (PDMS) with R2=CH$_3$ have proven themselves to be particularly suitable.

The silicon content in the monofilament is 0.05 to 2.0 weight-%, in particular 0.1 to 2 weight-%, preferably 0.1 to 1.0 weight-%.

The use of the soil-repellent monofilaments in accordance with the invention, having a diameter of 0.1 to 1.0 mm, in particular 0.2 to 0.6 mm, is particularly suited to the production of screen fabrics for paper-making machines.

The invention will be described in detail by means of an example.

Exemplary Embodiment

The production of the polymer takes place in a known manner by transesterification of dimethyl terephthalate and ethylene glycol and the addition of 3.9 weight-% of polydimethyl siloxane (PDMS) and manganese acetate in stirred autoclaves at 160 to 230° C. The generated methanol is quantitatively distilled off. The subsequent poly-condensation is performed over 200 min in a temperature range between 245° to 285° C. and with the use of an antimony catalyst, wherein condensation is performed in a first step in a progressive vacuum (1000–<50 bar) over 40 minutes and in a second step in a high vacuum (>1 mbar).

The polyethylene terephthalate/polydimethyl siloxane (PET/PDMS) is melted at a temperature of 290° C. Extrusion takes place by means of a spinneret with 13 capillaries and a capillary diameter of 1.8 mm at a polymer flow rate of 486 g/min. The extruded monofilament are cooled in a water bath at 70° C. After cooling the monofilaments are spin-prepared and stretched to a residual elongation of approximately >44%, relaxed and wound at a speed of 100 m/min. The resulting fiber has a soiling coefficient of less than 10 (<10) after five treatments, with a 500% stretching has a tenacity (Ft) of 36.1 cN/tex at an elongation (Dt) of 38.8% referred to the unstretched monofilament.

However, in place of the PET/PDMS as the polymer it is also possible to start with pure, commercially available polyester (polyethylene-terephthalate) and to add polydimethyl siloxane (PDMS) upstream of the extruder by means of a metering device.

The following method was developed for the determination of the soil-repellent effect of monofilaments for screen fabrics for paper-making machines:

Principle of the Testing Method (Soiling Test)

Rust-resistant small steel plates are exactly wound with three layers of the monofil. After rinsing out the spinning preparation and calorimetric measurements, the top of the sample is soiled eight times in accordance with a fixed method by "transfer printing" with wet newsprint in an ironing press at 130° C. Following calorimetric measuring, cleansing, drying and another calorimetric measurement are performed in a specific manner. This soiling/cleansing process is performed five times in a row for the simultaneous determination of the "soil release" properties. At each stage the DL* (D65)-values are indicated as quantitative results, with the cartels before they were first soiled respectively used as references. DL* (D65) corresponds to the brightness difference between the sample and the reference in daylight. To exclude the effects of color differences in the samples, the brightness decrease in percent is indicated, which is defined as $$AI = -[DL^*]/L^*_0 \times 100$$

and is called the soiling index.

Principle of the Test Method (Fibrillation Test)

To determine the fibrillation of monofilaments for screen fabrics for paper-making machines, a bundle of monofilaments of the same kind is beaten against a standardized solid body for 10 minutes at a frequency of 2000 to 3200 rpm.

The results of the fibrillation test are combined below, wherein the grading has the following meaning:

Grading of the Fibrillation 0.0–0.5: no or very weak fibrillation
0.5–1.5: weak fibrillation
1.5–3.5: moderate to strong fibrillation
3.5–4.5: very strong fibrillation
>4.5: very great damage The Fibrillation test results are collected in the following table.

TABLE I

FIBRILLATION TEST RESULTS

| Example | Grade at Beat Frequency [rpm] | | | |
|---|---|---|---|---|
| | 2000 | 2500 | 3000 | 3200 |
| 1 | 0.0 | 0.1 | 0.5 | 2.5 |
| 2 | 0.5 | 1.0 | 0.9 | 4.5 |
| 3 | 0.4 | 1.1 | 1.5 | 5.0 |
| 4 | 0.2 | 0.8 | 1.0 | 5.0 |

Example 1 shows the result with the monofilament in accordance with the invention, wherein no fibrillation at all occurs at 2000 beats per minute, while at 3200 beats a fibrillation of less than half that of the prior art occurs. Example 2 shows the result with a polyester made "soil-repellent" by means of a fluoropolymer, and the Examples 3 and 4, standard polyesters.

Furthermore, the monofilaments produced in accordance with the invention from PET/PDMS are less rigid than known monofilaments.

BRIEF DESCRIPTION OF THE DRAWING

The test results for the exemplary monofilament of the present invention will now be illustrated in more detail with reference to the accompanying drawing in which.

Figure 1:
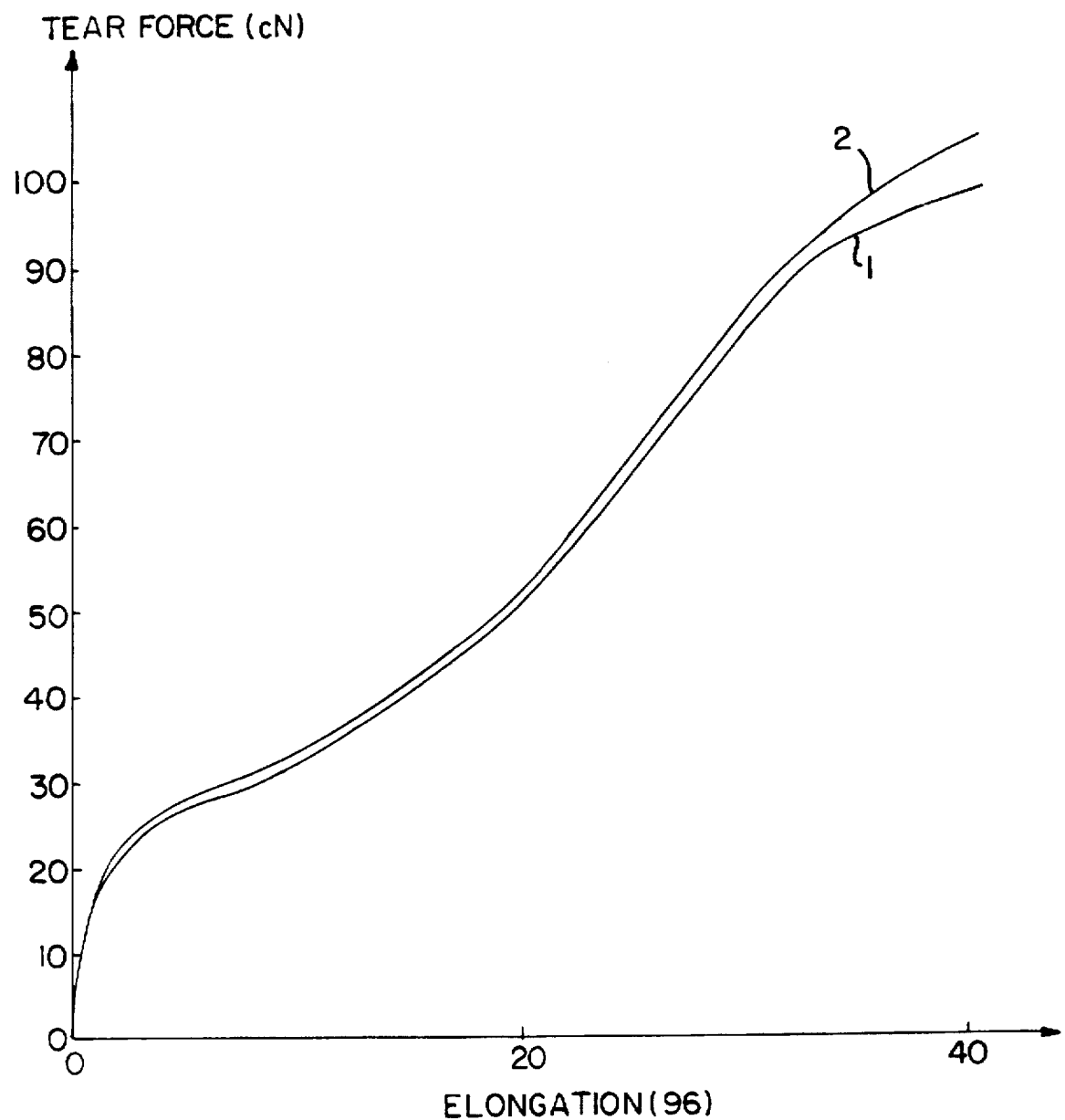
FIG. 1 is a graphical illustration showing tear force versus elongation results for the monofilament according to the invention.

From the force/elongation diagrams in FIG. 1 it can be seen that in a surprising manner the tenacity of the monofilament in accordance with the invention has not been reduced by copolymerization.

Figure 2:
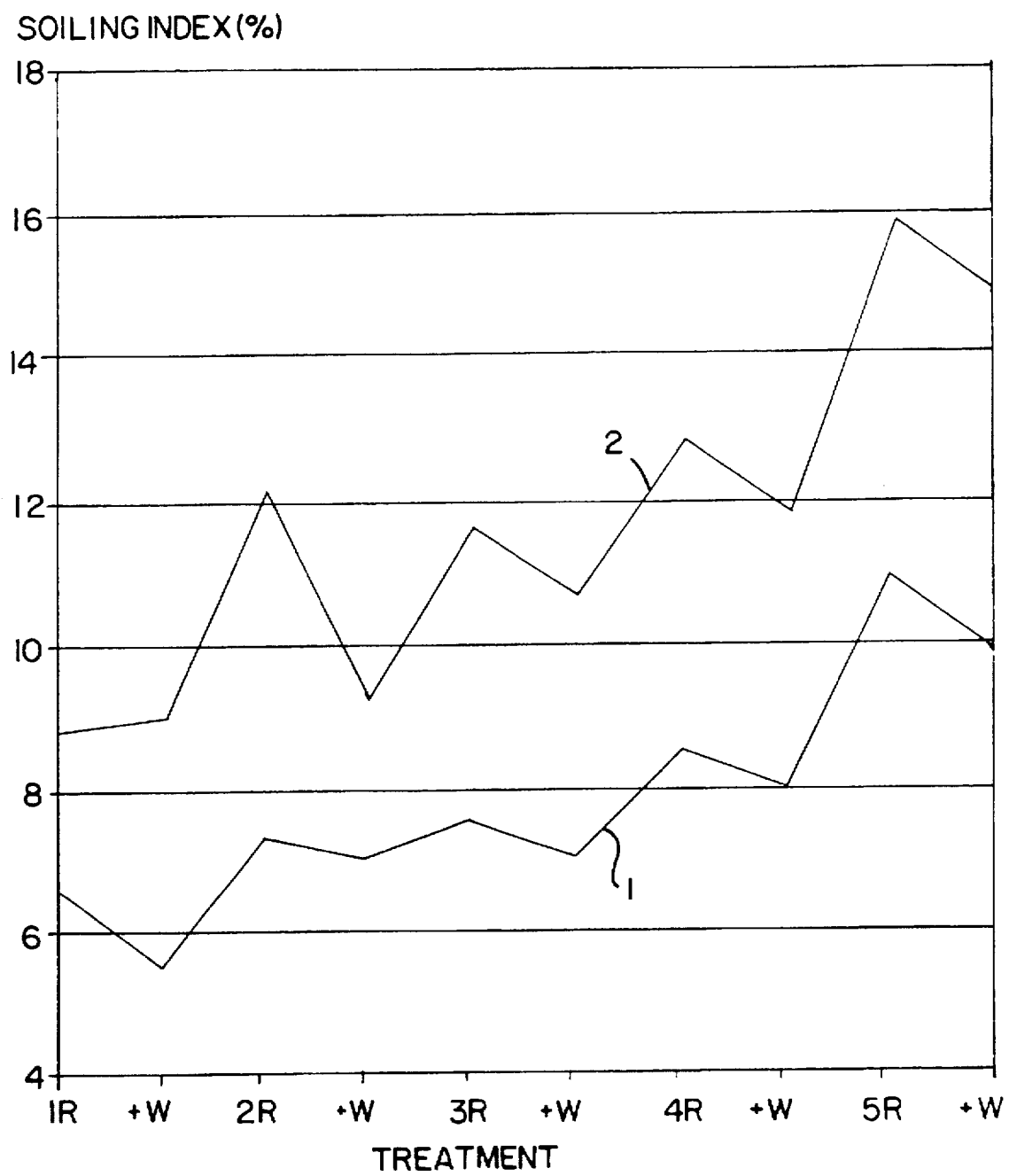
FIG. 2 is a graphical illustration showing soiling test results.

The values of the soiling indices represented in FIG. 2 show the effects of successive "soiling/cleansing" cycles. Mean values of two samples after soiling and cleansing are respectively represented. The curve 1 represents the monofilament fiber in accordance with the invention. Curve 2 represents a comparison fiber of polyester in accordance with the prior art, i.e. without the polydimethyl siloxane component. Following (five) 5 soiling/cleansing cycles, indices below 10 are attained with the monofilament in accordance with the invention.

Figure 3A:
FIG. 3 are photographs illustrating the fibrillation test results.
Figure 3B:

FIG. 3 shows in the form of photographs the results of a fibrillation test. FIG. 3a shows a polyester with a fluoropolymer; FIG. 3b the monofilament in accordance with the invention. It can be seen from this that the monofilament in accordance with the invention shows considerably less fibrillation. Under the same conditions, a sample made of polyethylene terephthalate in accordance with the prior art even shows a large weight reduction.

In the soiling test the monofilament fiber in accordance with the invention results in an improvement by at least a factor of 1.5 in respect to the prior art. The soil repellency of the fibers modified with siloxanes shows a clear improvement in comparison with the standard and approximately corresponds to that of the fluorine-containing special fibers which are questionable for reasons of environmental load. The abrasion resistance of the fibers is clearly increased in respect to the prior art. The monofilaments in accordance with the invention are preferably suited for use in paper-making machine fabrics.

While the invention has been illustrated and described as being embodied in methods of making and using soil-repellent and abrasion-resistant monofilaments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A soil-repellent and abrasion-resistant monofilament consisting of a linear silicone-modified polyethylene terephthalate having a silicon content of from 0.05 to 2.0% by weight based on the monofilament in which 0.15 to 5.0% by weight of a polydialkyl siloxane of formula I:

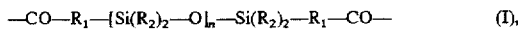

—CO—R$_1$—[Si(R$_2$)$_2$—O]$_n$—Si(R$_2$)$_2$—R$_1$—CO—   (I), wherein n is the number of repeated —Si(R$_2$)$_2$—O— groups and R$_1$ or R$_2$ represent equal or different radicals with 2 to 20 carbon atoms, is inserted into a polyethylene terephthalate polymer chain thereof;

wherein said monofilament has a cross-section with a diameter of from 0.1 to 1.0 mm, a homogeneous composition over said cross-section, a tenacity of at least 36 cN/tex, an elongation of less than 44% based on an unstretched portion of said monofilament and a soiling index of less than 10 after five soiling cycles.

2. The soil-repellent and abrasion-resistant monofilament as defined in claim 1 and having a fibrillation grade less than 0.1 at 2000 rpm.

3. The soil-repellent and abrasion-resistant monofilament as defined in claim 1, wherein said silicon content is from 0.10 to 1.0% by weight.

4. The soil-repellent and abrasion-resistant monofilament as defined in claim 3, wherein the monofilament shows substantially no fibrillation after being beaten against a solid body with a beat frequency of 2000 rpm for ten minutes.

5. A soil-repellent and abrasion-resistant monofilament consisting of a linear silicone-modified polyethylene terephthalate having a silicon content of from 0.05 to 2.0% by weight based on the monofilament in which 0.15 to 5.0% by weight of a polydimethyl siloxane of formula I:

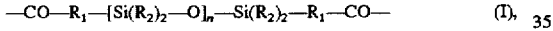

—CO—R$_1$—[Si(R$_2$)$_2$—O]$_n$—Si(R$_2$)$_2$—R$_1$—CO—   (I), wherein n is the number of repeated —Si(R$_2$)$_2$—O— groups, R$_2$ is a methyl group and R$_1$ represents a radical having 2 to 20 carbon atoms, is inserted into a polyethylene terephthalate polymer chain thereof;

wherein said monofilament has a cross-section with a diameter of from 0.1 to 1.0 mm, a homogeneous composition over said cross-section, a tenacity of at least 36 cN/tex, an elongation of less than 44% based on an unstretched portion of said monofilament, a soiling index of less than 10 after five soiling cycles and a fibrillation grade less than 0.1 at 2000 rpm.

6. A process of making a soil-repellent and abrasion-resistant monofilament, said process comprising the steps of:

a) transesterifying dimethylterephthalate with ethylene glycol to form a reaction mixture;

b) adding to said reaction mixture from 0.15 to 5 percent by weight of a polydialkylsiloxane of formula I:

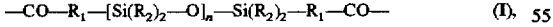

—CO—R$_1$—[Si(R$_2$)$_2$—O]$_n$—Si(R$_2$)$_2$—R$_1$—CO—   (I), wherein n is the number of repeated —Si(R$_2$)$_2$—O— groups and R$_1$ or R$_2$ represent equal or different radicals with 2 to 20 carbon atoms;

c) after the adding of step b), polycondensing to form a linear silicone-modified polyethylene terephthalate in which said polydialkyl siloxane of formula I is inserted into a polyethylene terephthalate polymer chain thereof; and d) extruding the linear silicone-modified polyethylene terephthalate to form a monofilament consisting of the silicone-modified polyethylene terephthalate with a silicon content of from 0.05 to 2.0% by weight and having a cross-section with a diameter of from 0.1 to 1.0 mm, a homogeneous composition over said cross-section, a tenacity of at least 36 cN/tex, an elongation of less than 44% based on an unstretched portion of said monofilament and a soiling index of less than 10 after five soiling cycles.

7. The process as defined in claim 6, wherein the monofilament has a fibrillation grade less than 0.1 at 2000 rpm.

8. The process as defined in claim 6, wherein said silicon content is from 0.10 to 1.0% by weight.

9. The process as defined in claim 8, wherein the monofilament shows substantially no fibrillation after being beaten against a solid body with a beat frequency of 2000 rpm for ten minutes.

10. A process of making a soil-repellent and abrasion-resistant monofilament, said process comprising the steps of:

a) transesterifying dimethylterephthalate with ethylene glycol to form a reaction mixture;

b) adding to said reaction mixture from 0.15 to 5 percent by weight of a polydimethylsiloxane of formula I:

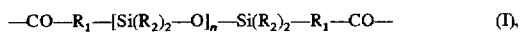

—CO—R$_1$—[Si(R$_2$)$_2$—O]$_n$—Si(R$_2$)$_2$—R$_1$—CO—   (I), wherein n is the number of repeated —Si(R$_2$)$_2$—R$_1$—CO— groups, R$_2$ is a methyl group and R$_1$ represents a radical having 2 to 20 carbon atoms;

c) after the adding of step b), polycondensing to form a linear silicone-modified polyethylene terephthalate in which said polydimethyl siloxane of formula I is inserted into a polyethylene terephthalate polymer chain thereof; and d) extruding the linear silicone-modified polyethylene terephthalate to form a monofilament consisting of the silicone-modified polyethylene terephthalate with a silicon content of from 0.05 to 2.0% by weight and having a cross-section with a diameter of from 0.1 to 1.0 mm, a homogeneous composition over said cross-section, a tenacity of at least 36 cN/tex, an elongation of less than 44% based on an unstretched portion of said monofilament, a soiling index of less than 10 after five soiling cycles and a fibrillation grade less than 0.1 at 2000 rpm.

* * * * *